United States Patent [19]

Swiden et al.

[11] 3,917,353

[45] Nov. 4, 1975

[54] METHOD AND APPARATUS FOR CONTROL OF ANTI-SKID VEHICLE BRAKING SYSTEM

[76] Inventors: Lennart Bror Anders Swiden, Bjornsbacken 32, S-59061 Vreta Kloster; Waldemar Lester, Bondegatan 11 B, S-58263 Linkoping, both of Sweden

[22] Filed: Feb. 4, 1975

[21] Appl. No.: 439,402

[30] Foreign Application Priority Data

Feb. 6, 1973   Sweden............................ 7301592

[52] U.S. Cl................................. 303/21 BE; 303/20
[51] Int. Cl.² ........................................... B60T 8/08
[58] Field of Search ...... 188/181; 307/10 R; 303/20, 303/21; 317/5; 324/161–162; 340/53, 62, 262–263

[56] References Cited
UNITED STATES PATENTS

| | | | |
|---|---|---|---|
| 3,578,819 | 5/1971 | Atkins........................... | 303/21 BE |
| 3,584,921 | 6/1971 | Crawford...................... | 303/21 BE |
| 3,635,530 | 1/1972 | Packer et al................... | 303/20 X |
| 3,710,186 | 1/1973 | Sharp............................. | 317/5 |
| 3,773,364 | 11/1973 | Michellone et al............ | 303/20 X |
| 3,790,227 | 2/1974 | Dozier........................... | 303/21 BE |
| 3,822,921 | 7/1974 | Jones............................. | 303/21 BE |
| 3,825,305 | 7/1974 | Kasselmann et al........... | 303/21 BE |

Primary Examiner—George E. A. Halvosa
Assistant Examiner—Stephen G. Kunin

[57] ABSTRACT

An electronic control for a wheel controlled by an anti-skid hydraulic braking system has an input that always corresponds to rotational speed of the wheel and issues a brake-releasing input to a hydraulic regulator when the rate of deceleration of the wheel under braking force is substantially equal to the rate at which the wheel would decelerate when its sliding on a high friction road surface attained the peak of the curve of sliding effect versus coefficient of friction. An input commanding reapplication of braking force is issued when rotational speed of the accelerating wheel is equal to the rotational speed the wheel would have attained if it had decelerated from the rotational speed it had when the last previous brake releasing input was issued, through the time since that input, at a rate corresponding to best attainable deceleration of the vehicle on a surface affording the worst possible braking conditions.

2 Claims, 14 Drawing Figures

METHOD AND APPARATUS FOR CONTROL OF ANTI-SKID VEHICLE BRAKING SYSTEM

This invention relates to anti-skid automatic brake control systems for vehicle wheels, by which braking forces are alternately applied to and released from wheels of a vehicle all during the time that a brake pedal or similar manual control is held in a braking position, and in which such alternate application and release of braking force is so regulated as to prevent locking of the wheels. More particularly the invention relates to control means for so regulating the alternate application and release of braking forces as to insure deceleration of the braked vehicle at a rate which is at or near the maximum permitted by the friction of the surface on which the vehicle is riding and which is tolerable to the occupants of the vehicle.

Hydraulic brake systems are known wherein an anti-skid hydraulic pressure control device is connected between a master cylinder operated by a brake pedal and brake servo cylinders at the braked wheels. The purpose of the device is to prevent the skidding and sliding of the vehicle that might otherwise occur during hard braking, when the wheels "lock" or stop rotating while the vehicle continues to move under its momentum. All during the time that the brake pedal is held in its braking position, the pressure control device so governs the pressure of the hydraulic fluid at the brake cylinders as to cause braking force to be alternately applied and relieved in a manner to prevent each braked wheel from locking until the vehicle has come to a standstill.

One form of hydraulic pressure control device for such anti-skid braking systems is disclosed in U.S. Pat. No. 3,544,171, to W. Lester et al. As brought out in that patent, an anti-skid braking system must also include control apparatus for issuing to the hydraulic pressure control device input signals that cause it to apply and release braking force in a manner to achieve optimum braking action. The present invention is concerned, very generally, with such control apparatus, whereby a brake release control input is issued to the hydraulic device, to cause it to release brake pressure at a wheel whenever the wheel is rotating too slowly for the speed at which the vehicle is being propelled by momentum, and whereby a brake applying control input is subsequently issued to the hydraulic device to cause it to apply braking force to the wheel as soon as the wheel has come back up to a rotational speed at which it is advantageous to brake it.

It will be apparent that the control device which issues the brake releasing and brake reapplying control inputs to the hydraulic mechanism must operate on the basis of two criteria, namely, a criterion or critical value for issuing a brake releasing input and another criterion or critical value for issuing a brake reapplying input.

A satisfactory criterion for issuance of the brake releasing input is known in the art, and satisfactory means are also known for establishing and signaling the value of that criterion and for utilizing its value signal in the issuance of brake release inputs to the hydraulic pressure control device.

For an understanding of that brake release criterion and, more important, for an understanding of the present invention and its objects, it is necessary to consider the action of a wheel that has a braking force imposed upon it.

When a wheel is decelerated under the influence of a braking force, inertia of the vehicle imposes upon the wheel a horizontal force that tends to cause the wheel to slide along the road. Through a range of low values of sliding velocity, the coefficient of friction between the wheel and the road increases with increasing sliding velocity, reaches a peak, and then, with further increase in sliding velocity, steadily decreases. The curve of sliding velocity versus coefficient of friction thus has a rather steep ascending flank, a rounded but fairly distinct peak, and a more gradual descending flank. Hence, if there is a small difference between the rolling speed of the wheel and the forward speed of the vehicle, so that the wheel has only a small sliding velocity, there will be a maximum or near-maximum coefficient of friction between the wheel and the road that will be very effective in braking the vehicle. If the sliding velocity reaches a relatively high value, as when the wheel locks while the vehicle continues to move under momentum, the coefficient of friction will be relatively far down the descending flank of the curve and may be so low that the vehicle obtains relatively little braking deceleration and can readily respond to lateral forces and enter a skid.

It is known that with an anti-skid braking system, braking force should be relieved at a time shortly after the sliding velocity has passed the value for maximum coefficient of friction. It is obvious that if braking force continued to be applied for any substantial time after sliding velocity had passed the peak of the friction curve, the braking force would slow down wheel rotation at a rapid rate of deceleration, owing to the decreasing friction force tending to keep the wheel in rotation, and the reapplication of braking force would have to be delayed for an excessively long time while the wheel regained rotational speed. It is also obvious that releasing braking force before the peak of the friction curve was attained would make the most useful part of the curve unavailable.

It has also been known for some time that the rate of deceleration of the braked wheel can be compared with a predetermined deceleration value that serves as a brake release criterion, so that a brake release input can be issued to the hydraulic pressure control device whenever the rate of deceleration of the wheel is at least equal to that predetermined deceleration value. The predetermined value that serves as the brake release criterion corresponds to a function of the rate of deceleration of the wheel that is attainable with maximum frictional adhesion between the wheel and the road. Since full release of braking force does not take place instantaneously, but occurs progressively through a short but finite time after a brake release control input is issued to the hydraulic control device, the wheel continues to decelerate for a brief time after such an input is issued. Hence, if the criterion for issuance of the input is the rate of deceleration of the wheel that will attain the sliding velocity at the peak of the friction coefficient curve, assurance is had that the wheel will continue to decelerate to a point on that curve which is slightly beyond its peak, and will then begin to accelerate when braking force is fully relieved.

Obviously, if the road is slippery, the braked wheel will decelerate more rapidly than under good braking conditions, and the criterion value for deceleration will be reached more quickly. As a result, braking force will be applied for shorter intervals on a slippery surface, with the expectable overall result than when braked from a given speed the vehicle will travel a greater distance before coming to a full stop.

The selection of a corresponding criterion for the reapplication of braking force to the temporarily unbraked wheel has posed a problem that has not heretofore been satisfactorily solved.

It is clear enough that braking force should be reapplied when the freely rotating wheel has been accelerated to a rotational speed such that its sliding speed is on the rising flank of the friction curve, and is preferably near to but below the peak of that curve. But the rate of acceleration of the unbraked wheel is dependent upon friction between the wheel and the road, and therefore that rate of acceleration is unpredictable, being low when the road is slippery and high when the road is dry and rough. Thus it is not possible to use as a criterion for brake force reapplication a predetermined acceleration rate for the temporarily unbraked wheel, corresponding in principle to the above-explained predetermined deceleration rate for the braked wheel that is used as a criterion for brake releasing.

Inasmuch as the sliding velocity of the temporarily unbraked wheel is, at any instant, a function of the forward speed of the vehicle and the rotational speed of the wheel, a considerable amount of physical and mathematical ingenuity and electronic know-how have been applied for the purpose of employing ascertainable functions of those speeds as a criterion for the reapplication of braking force. To this end attempts have been made to measure the deceleration behavior of the vehicle and the friction between the wheel and the road, and to issue a signal for the reapplication of braking force when conditions indicated that the wheel was running without slide. Apparatus operating on such principles is necessarily complicated and expensive because of the several signals which must be generated, updated, corrected, selected and compared. Such apparatus has yielded only approximately correct results and has been relatively slow-acting, owing to the time required for signal processing, with the result that it has afforded an unnecessarily prolonged braking process.

In view of the fact that it is not practical to rely on the actual acceleration of the temporarily unbraked wheel to provide a criterion for the issuance of an input that will cause braking force to be reapplied to it, it is a general object of the present invention to provide control apparatus for an anti-skid braking system that utilizes another and very readily available criterion, capable of being directly compared with a function of rotational speed of the braked wheel without requiring any indication of the deceleration or acceleration of the vehicle or any indication of road surface conditions as such.

In general the invention rests upon a recognition that information upon which a criterion for brake force reapplication can be based is readily available during the deceleration period which precedes release of the brake force.

Thus it is another and more specific object of this invention to provide control apparatus for an anti-skid brake system that embodies a very simple, reliable and readily available criterion for determining the time at which braking force should be reapplied to a temporarily unbraked wheel in order to achieve optimum overall braking effectiveness.

It is another specific object of this invention to provide control apparatus for an anti-skid braking system wherein all regulation takes place in direct relation to a rotational speed signal from the wheel to be controlledly braked, so that the system always has a direct feedback that corresponds to actual conditions, thereby ensuring safe control of the braking process.

Another and more general object of the invention is to provide a simple, reliable electronic control apparatus for an anti-skid braking system, capable of producing even, cyclically controlled braking from a maximum driving speed down to a complete standstill of the vehicle, with substantially optimum deceleration of the vehicle irrespective of the frictional conditions between the wheels and the road.

The extent to which the invention achieves the above stated objects is evident from the fact that tests of an embodiment of the invention have shown that it is capable of effecting fully controlled optimum deceleration of a vehicle from a high driving speed while the vehicle is being steered accurately along a defined path of sharp S-curves.

Inasmuch as the control apparatus of this invention provides for the application of braking force to a wheel alternately with the release of braking force therefrom, the invention has as another of its objects the provision of means in such control apparatus for insuring that brake force will be applied to the wheels after the vehicle comes to a full stop, for as long as the driver continues to hold the brake pedal in its braking position.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

ANTI-SKID BRAKING SYSTEM GENERALLY

Referring now to the accompanying drawings, the numerals 1 and 2 designate two wheels of a vehicle having a hydraulic braking system equipped with apparatus embodying the principles of the present invention. Each of the wheels has a generally conventional brake 3 that comprises a hydraulic brake cylinder or actuator. All of the brakes are connected in a hydraulic system, designated generally by 4, comprising a master cylinder 5 and hydraulic lines 6 through which hydraulic pressure fluid can be forced from the master cylinder towards the brakes 3. It will be understood that hydraulic fluid in the system is pressurized when a brake pedal or other manually operable control that is connected with the master cylinder is held in a braking position thereof. Although the master cylinder is illustrated as having only one outlet for hydraulic pressure fluid, it could obviously be a so-called twin actuating cylinder with two (or more) such outlets, for operation of additional partial hydraulic systems comprising a part of the braking system.

The brake hydraulic system also includes a plurality of servo controlled hydraulic pressure regulating devices 7, one for each braked wheel, each interposed in the hydraulic system between the master cylinder 5 and the brake for its wheel. Each hydraulic pressure regulating device is preferably of the type disclosed in U.S. Pat. No. 3,544,171. Very generally, the regulating device 7 comprises a solenoid valve 8 that controls flow of a servo fluid which enters the device by way of a line 9. The servo fluid is available from a source 10 at which it is maintained under a substantially constant pressure.

The solenoid valve 8 of each regulating device 7 responds to alternating one and zero control inputs from an electronic control apparatus 11 that is described below. In response to a zero input the hydraulic pressure regulating device allows hydraulic pressure fluid to be forced from the master cylinder 5 through the hydraulic lines 6 to the brake 3 for its regulating device, causing that brake to be applied to its wheel. In response to a one signal to its solenoid valve, the regulating device causes braking force to be removed from its wheel. Such one and zero impulses alternate with one another in fairly rapid succession and in such a manner as to insure for each wheel substantially optimum braking action under prevailing conditions.

Figure 1:
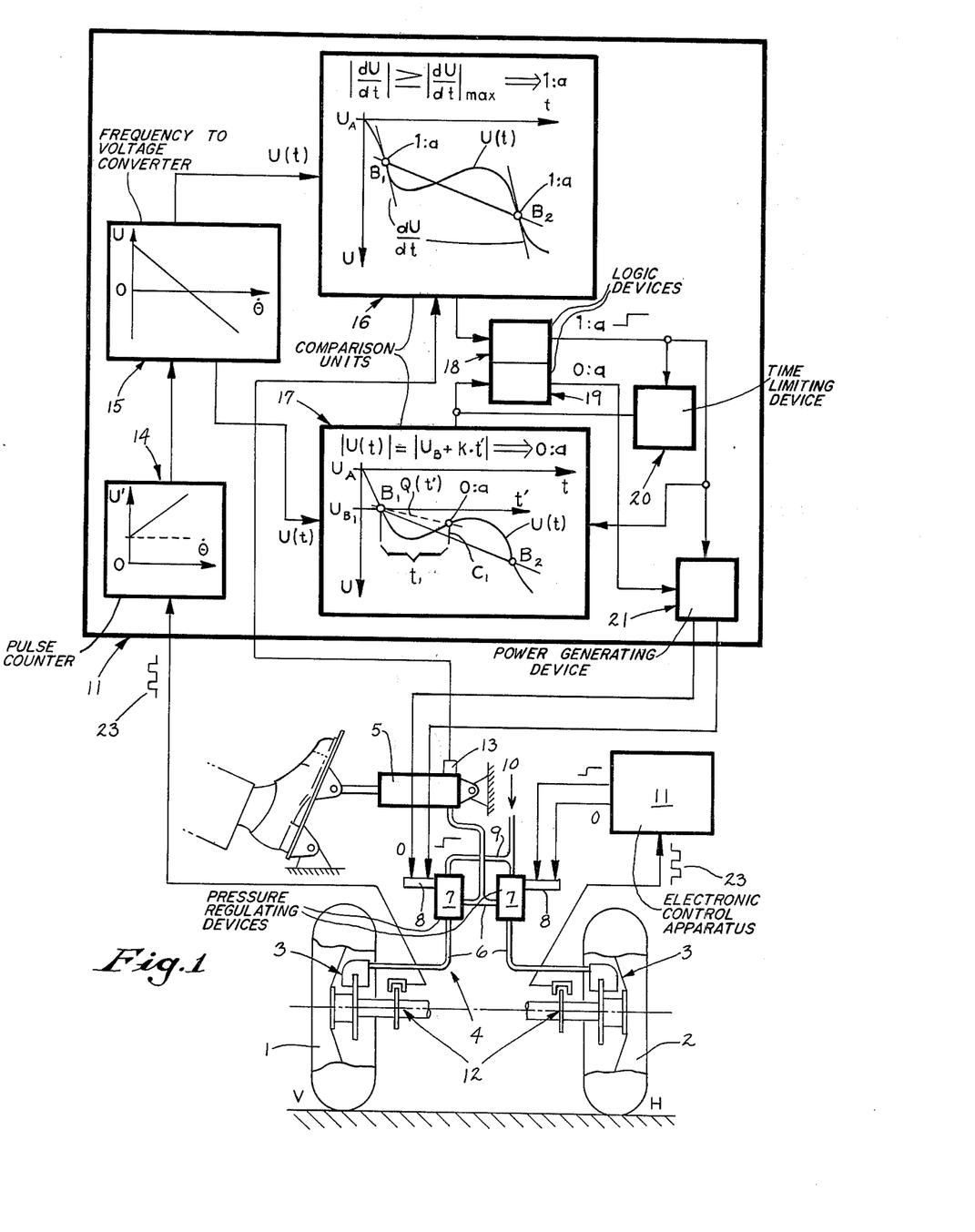
FIG. 1 is a schematic block diagram illustrating the principal components of an automatic anti-skid brake regulating system embodying the principles of this invention, but showing functions of the control channel for only one of the braked wheels.

There is an electronic control apparatus 11 for each wheel to be braked. In FIG. 1, the principal elements of the apparatus 11 for the wheel 1 are illustrated more or less functionally, and it will be understood that there is a similar apparatus for each of the other braked wheels. The circuitry of the electronic control apparatus for a wheel is diagrammed in FIG. 2.

The electronic control apparatus for each wheel receives its current supply from the vehicle battery, being connected thereto in a manner described hereinafter.

One input to the electronic control apparatus for each wheel is in the form of a starting signal produced by an electric switch 13 or the like that is operatively associated with the brake master cylinder 5. When the manually operable brake control is moved to its braking position, the signaling device 13 functions to cause the electronic apparatus to go into operation.

Another input to each control apparatus is in the form of a constant amplitude squarewave signal 23 having a frequency that accurately corresponds to the rotational speed of its wheel. The mechanism 12 for generating this signal is located at the wheel and can comprise apparatus such as is disclosed in the applicants' copending application, Ser. No. 438,729, filed Feb. 1, 1974. The square-wave signal generated by the mechanism 12 has nearly vertical flanks, and when the wheel has a constant rotational speed the zero and one pulses of the signal are of equal duration.

The incoming square-wave signal from the rotational speed signal generator 12 at the wheel is fed to a pulse counter 14. It generates a speed signal in the form of a voltage $U'$ which is proportional to the frequency of the pulse train and is thus a linear function of the rotational speed of the wheel. The speed signal $U'$ is fed to a converter 15 which converts it to a voltage signal $U$ that is an analogue of the speed signal voltage $U'$, being a linear function of wheel speed having positive values through one range of wheel speeds and negative values through the remainder of said range.

The output of the converter 15 is fed in parallel to first and second comparison units 16 and 17. The first comparison unit 16 in effect embodies a brake releasing criterion and compares the prevailing deceleration of the wheel (as manifested by the converted wheel speed signal $U$) with that criterion, issuing a brake releasing impulse when that criterion is satisfied. The second comparison unit 17 compares prevailing wheel speed with a criterion for brake reapplication and issues a signal which effects brake reapplication when the existing wheel speed satisfies the latter criterion.

The output of the first comparison unit 16 is fed to a logic device 18; that of the second comparison circuit 17 is fed to a logic device 19. The outputs of the logic devices 18 and 19 are fed through a power generating device 21 which amplifies them and feeds them to the solenoid 8 of the hydraulic regulator 7. Thus the outputs of the power generating device constitute the above described one and zero inputs to the solenoid 8 which respectively cause release of braking force and reapplication of braking force.

Conceivably the last input delivered to the hydraulic regulator 7 before the vehicle reaches a standstill could be a one signal that would tend to leave the brakes released. To insure that the brakes will be reapplied if the brake pedal remains depressed, so that the vehicle cannot roll out of its stopped position, a time limiting device 20 is connected between the two logic devices 18 and 19, and it serves to cause a brake applying zero input to be issued to the hydraulic regulator 7 after a given interval of brake release during which there is no speed signal from the wheel and the brake pedal remains depressed.

Before considering the electronic control apparatus 11 in more detail, the theory of its operation will be explained.

FORCES AFFECTING WHEEL DECELERATION AND ACCELERATION

If a vehicle is being driven at a high constant speed, and the driver suddenly and powerfully moves the brake pedal to its braking position, a large braking moment $M_B$ is imposed upon each wheel of the vehicle. This braking moment and the several other forces acting upon a wheel during braking are illustrated in FIG. 9.

The rotational acceleration or deceleration of the wheel is given by:

$$\frac{d\dot{\theta}}{dt} = \frac{1}{I}(-M_R + M_F - M_B) \quad 1$$

Figure 9:
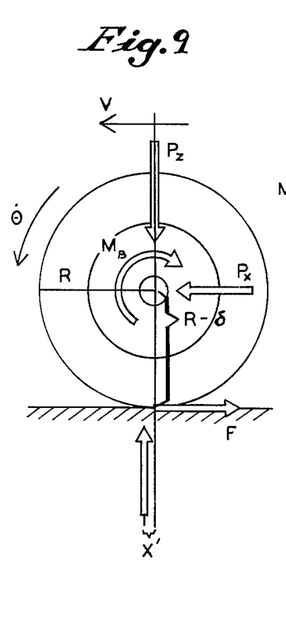
FIG. 9 illustrates the forces that act upon a braked vehicle wheel.

The following notations are used in the above equation and in FIG. 9:

$F =$ the friction between the road and the wheel caused by sliding of the wheel;
$P_x =$ force of inertia acting on the wheel in the direction of travel, with the vehicle at velocity V;
$P_z =$ load acting downwardly on the wheel;
$I =$ moment of inertia of the wheel;
$M_B =$ braking moment applied to the wheel;
$M_F = F(R - \delta_1) = P_z \mu (R - \delta_W) =$ moment imposed on the wheel by the force of friction $F$;
$M_R = P_z \cdot X'$, where $X'$ is the horizontal distance, due to tire compression, at which the load acts;
$R =$ radius of the wheel;
$\dot{\theta} =$ angular velocity of the wheel; and
$\delta =$ tire compression.

In equation 1 the term $M_R$ is roughly constant, and by comparison with $M_F$ and $M_B$ it is of such a low order of magnitude that it is neglected in the following discussion.

The sliding effect caused by braking is given by:

$$S = 1 - \frac{\dot{\theta} \cdot Re}{V} \quad 2$$

where
$Re =$ rolling radius of the wheel and
$(V/Re) =$ angular velocity for a free-running wheel at vehicle speed $V$.

DECELERATION THRESHOLD VALUE

If the speed signal U is a linear function of the rotational speed $\dot{\theta}$ of the wheel, a signal for release of the braking force that is being applied to the wheel should be issued when the rate of wheel deceleration reaches a deceleration threshold value that is expressed by:

$$\left|\frac{dU}{dt}\right|_{max} = \text{constant} \cdot \left|\frac{d\dot{\theta}}{dt}\right|_{max} \quad 3$$

In turn:

$$\left|\frac{d\dot{\theta}}{dt}\right|_{max} = (1 - S)\frac{\dot{V}\,max}{R_e} \quad (4)$$

Where:
$\dot{V}\,max =$ maximum deceleration of the vehicle that is tolerable to its occupants, selected at 6 or 8 m/S².
As can be seen from equation 4, the magnitude of $$\left|\frac{d\dot{\theta}}{dt}\right|_{max}$$

is mainly determined by the term $$\frac{\dot{V}\,max}{Re},$$

i.e., by $\dot{V}max$, since $Re$ is constant.

Figure 7:
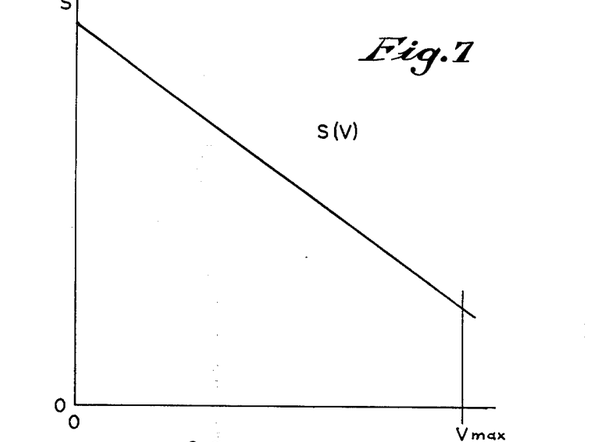
FIG. 7 illustrates how optimal wheel slide — that is, wheel slide with optimal friction — varies with the speed of the vehicle.

The sliding effect S appears in practice to vary in roughly linear relation to vehicle speed, as shown in FIG. 7. However, its values have only a relatively small variation through the range of normal vehicle speeds, being between 0.2 at zero Km/h and 0.05 at 240 Km/h. Hence a mean value of 0.15 can be taken for the sliding effect, so that $(1 - S) = 0.85$. It follows that the term $(1 - S)$ is of an order of magnitude close to 1, and therefore the relationship between sliding effect and vehicle speed is of negligible significance to the magnitude of $$\left|\frac{d\dot{\theta}}{dt}\right|_{max.}$$

It is known that selecting $$\left|\frac{d\dot{\theta}}{dt}\right|_{max}$$

in accordance with the above described vehicle deceleration always achieves, in practice, an optimal sliding effect $S_T$ (see FIG. 8), corresponding to an optimal attainable coefficient of friction $\mu$ between the wheel and the ground.

Figures 3, 4, 5:
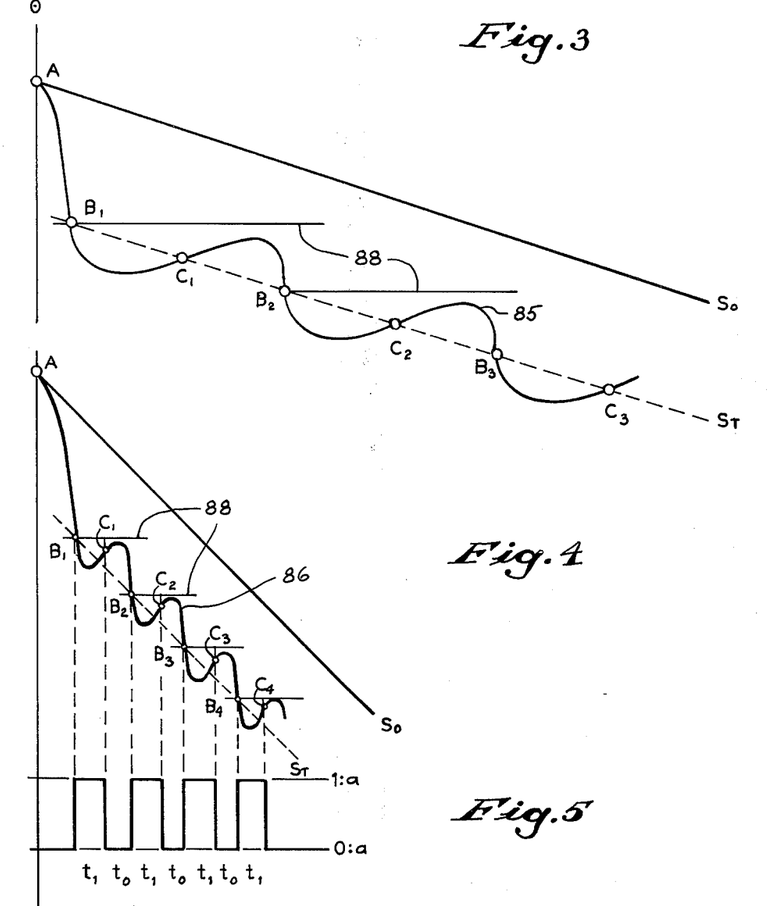
FIG. 3 depicts, in graph form, wheel speed as a function of time, in relation to brake release and brake applying inputs, under the conditions of a minimum attainable coefficient of friction between the wheel and the road.
FIG. 4 is a graph similar to FIG. 3 but illustrating conditions with a maximum coefficient of friction between the wheel and the road.
FIG. 5 illustrates brake applying and brake release inputs issued from the electronic control apparatus of this invention in the form of "zero" and "one" pulses, in their time relationship to the braking process illustrated in FIG. 4.
Figure 6:
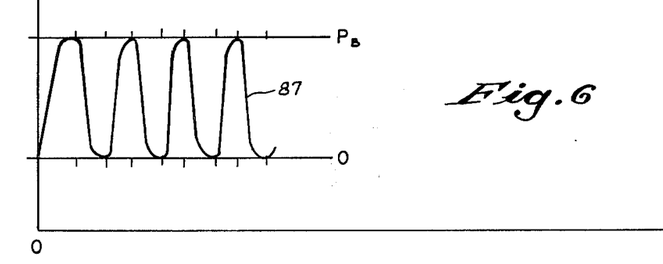
FIG. 6 illustrates, in the form of a graph, how the apparatus of this invention causes braking force upon a wheel to vary with time during a period when the driver is holding the brake control in its braking position, under the conditions illustrated in FIGS. 4 and 5.

FIGS. 3 and 4 illustrate the braking action that takes place during several cycles of alternate brake force application and release, with brake force releasing inputs (one inputs $t_1$) issued to the hydraulic regulating device at times determined according to the brake releasing criterion of this invention. In FIG. 3 the curve 85 illustrates how the rotational speed of a braked and controlled wheel varies with time t during braking on a very slippery surface. The curve 86 in FIG. 4 similarly depicts wheel speed during several cycles under good braking conditions, i.e., a dry, rough surface. FIG. 5 depicts the one (brake releasing) inputs $t_1$ and the zero (brake applying) inputs $t_o$ in their relation to the consequent decreases and increases in rotational speed of the wheel that are illustrated in FIG. 4. The curve 87 in FIG. 6 shows variations in the braking forces imposed upon the wheel in consequence of the inputs illustrated in FIG. 5. In each of FIGS. 3 and 4 the curve $S_o$ represents the speed which a wheel rolling without slide would develop at the vehicle deceleration caused by the braking action.

The braking action starts at point A, the speed at which the unbraked wheel is rolling due to vehicle speed. Each time the wheel deceleration reaches the deceleration criterion — that is, each time the $$\frac{dU}{dt}$$

signal reaches the deceleration threshold value $$\left|\frac{d\dot\theta}{dt}\right|_{max} ,$$

a brake release impulse $t_1$ is issued. This occurs at each of the points $B_1$, $B_2$, $B_3$. And since the criterion for each such brake release is the attainment of a deceleration which assures that the wheel slide is at the peak value $S_T$ of the friction curve (see FIG. 8), the several points $B_1$, $B_2$, $B_3$ can be connected to define the curve $S_T$ in FIGS. 3 and 4. Note that each of the curves 85 and 86 oscillates about the $S_T$ curve, never departing greatly from that curve.

Figure 8:
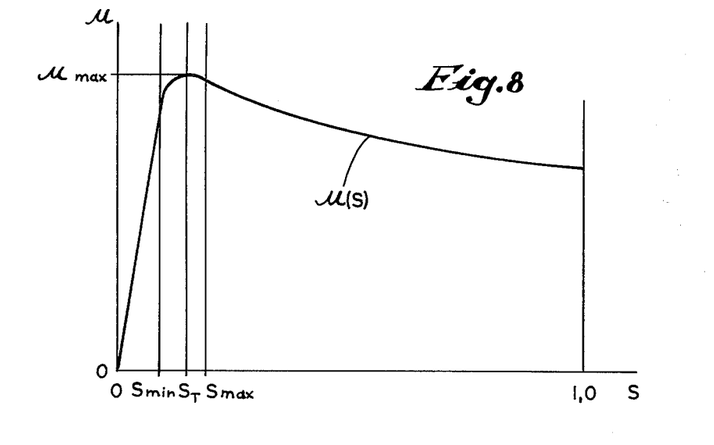
FIG. 8 illustrates the relationship between wheel-to-road coefficient of friction and sliding velocity of the wheel.
Figure 10:
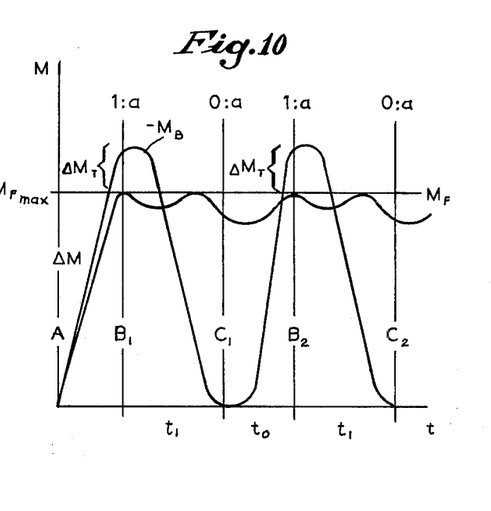
FIG. 10 shows diagrammatically the variation with time of certain of the moments illustrated in FIG. 9 as they act upon a wheel during the course of a braking process carried out according to the present invention.

The torque forces that act on the wheel during controlled braking vary as shown in FIG. 10. The wheel rotation is decelerated by the braking moment $M_B$ and is accelerated by the torque due to the friction moment $M_F$. The moment $M_F$, caused by sliding of the wheel on the road, of course reaches its maximum value at the top of the friction curve, i.e., when sliding action reaches the value $S_T$ as shown in FIG. 8. Referring back to FIG. 10, a braking moment applied to the wheel at point A rises steeply during the first phase of the braking cycle. The moment of friction $\mu_F$ likewise rises during that phase, but at a slightly lower rate. The wheel is therefore decelerated by a differential moment $\Delta M = M_B - M_F$.

Because of the rounded peak of the $\mu(S)$ friction curve, the braking moment $M_F$ rises more rapidly relative to the friction moment $M_B$ as the latter nears its maximum value. In this rather brief part of the cycle the differential moment $\Delta M$ has the value $\Delta M_T$, which considerably exceeds its previous value, and therefore the wheel decelerates at an increasingly rapid rate. From equation 3 it will be apparent that the deceleration threshold value — i.e., the criterion for issuance of a one input — is met when $$\left|\frac{\Delta M}{I}\right| \geq \left|\frac{d\dot\theta}{dt}\right|_{max} \qquad 5$$

and that the deceleration threshold value is not met until the friction moment $M_F$ has attained its maximum value, when:

$$\left|\frac{\Delta M_T}{I}\right| \geq \left|\frac{d\dot\theta}{dt}\right|_{max} .$$

It will be apparent from FIG. 10 that $\Delta M_T$ is also attained in each of the braking cycles subsequent to the first one, whenever the braking moment, due to the restored application of braking force, substantially exceeds the friction moment $M_F$.

Because the deceleration of the wheel in response to the $\Delta M_T$ moment occurs at a rapidly increasing rate, it is practical and relatively easy to detect the deceleration threshold value with electronic apparatus such as is described hereinafter.

BRAKE FORCE RESTORING CRITERION

The present invention rests upon the discovery that a criterion for the issuance of a zero input that restores the application of braking force can be based upon events that occur during the wheel deceleration cycle that precedes the wheel acceleration event.

In general, the criterion for restoration of braking force is based upon a preselected vehicle deceleration rate, and brake force is restored when wheel speed reaches the value that it would have if the vehicle had decelerated at that preselected rate during the time following issuance of the immediately preceding brake release impulse. The preselected vehicle deceleration rate is taken as the maximum deceleration that the vehicle could achieve with controlled braking on a surface that provides the lowest attainable friction with the wheel. Thus if FIG. 3 represents the situation with a slippery road that presents the worst expectable braking conditions, the curve $S_0$ depicts the wheel speed that is used in calculating the time for issuance of a brake reapplying zero input.

Stated in another way, an input for reapplication of braking force is issued when the wheel has accelerated to the speed it would have attained if it had decelerated from the rotational speed it had when the last previous brake releasing input was issued, through the time since that input, at a rate corresponding to the best attainable deceleration of the vehicle on a surface affording the worst possible braking conditions. Note that the application of this criterion requires detection only of rotational speed of the wheel at the instant each brake releasing input is issued and continuously thereafter during the wheel acceleration phase. Such detection is of course provided for in the wheel speed signal generator 12.

More specifically, the brake force restoration criterion can be expressed as a comparison of two wheel speeds:

$$|\Omega(t)| = |\dot\theta_w(t')| \qquad 6$$

or, in terms of signals:

$$|Q(t')| = |U(t)| \qquad 7$$

where:

$$Q(t) = U_B + K \cdot t' \qquad 8$$

and where:

$\Omega$ = wheel speed calculated on the basis of the above described best attainable vehicle deceleration under worst expectable braking conditions;

$Q$ = speed signal corresponding to the wheel speed $\Omega$;

$U_B$ = wheel speed signal $U$ issued at the time B, i.e., the time when the deceleration threshold value has been attained;

$K$ = gradient of a linear curve $Q(t')$ representing the preselected vehicle deceleration started at time $B$; and $t'$ = time elapsed since immediately preceding time $B$.

Figure 8A:
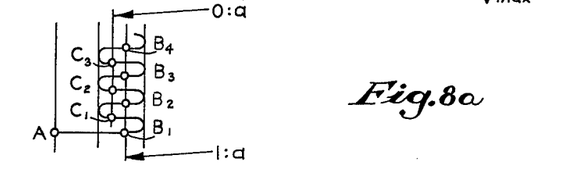
FIGS. 8a and 8b illustrate the sliding velocity of a wheel as it varies with time under the influence of brake releasing impulses B and brake applying impulses C that are issued by the control apparatus of this invention, FIG. 8a illustrating the situation with a very slippery road and FIG. 8b illustrating the situation on a road affording good braking and both of FIGS. 8a and 8b being comparable with FIG. 8 for evaluation of the coefficient of friction between the wheel and the road at each instant.
Figure 8B:
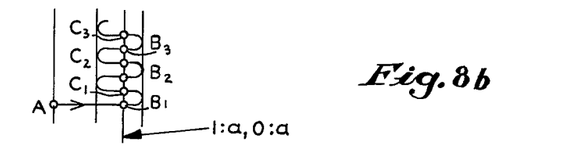

The gradient $K$ is selected to enable the controlled wheel to develop an acceleration which will obtain for it the greatest possible coefficient of friction on the rising flank of the friction curve $\mu(S)$ illustrated in FIG. 8, so that it will attain the sliding action denoted by $S_{min}$ in that figure. The rotational speed of the wheel during the entire braking cycle will then closely follow the $S_T$ curve (FIGS. 3 and 4), and the fluctuations in its rotational speed will carry it back and forth across the top of the friction curve, between the sliding actions $S_{max}$ and $S_{min}$, as shown diagrammatically in FIGS. 8a and 8b.

With the gradient $K$ selected for a minimum friction road surface, such as would exist on surface ice or during aquaplaning, then, if the actual surface has such low friction, the points $C_1$, $C_2$, $C_3$ at which the brake reapplying zero inputs are emitted will be located on the $S_T$ curve as shown in FIG. 3. This follows from the fact that under the slippery road conditions assumed for FIG. 3, the $S_T$ curve would coincide with the $Q(t')$ curve (which is illustrated in box 17 in FIG. 1) by reason of the definition of the latter. If the actual road friction is substantially higher, then, as shown in FIG. 4, the points $C_1$, $C_2$, $C_3$ will be located above the $S_T$ curve, i.e., between the $S_T$ curve and a curve 88 which is parallel to the time axis and which represents a theoretical wheel speed that would occur if the wheel were to continue to rotate at the speed it had at point B.

From a comparison of the points $C_1$, $C_2$, $C_3$ in FIG. 4 with those in FIG. 3 it will be apparent that with a high friction surface the brake reapplication criterion of this invention results in somewhat later reapplication of braking force than would be obtained if the restoration time criterion were based upon a vehicle deceleration obtainable with an optimum friction road surface. However, this loss of time is very insignificant, owing to the great rapidity with which wheel speed fluctuations occur on the higher friction surface.

As can be deduced from the criteria themselves, the present invention enables the wheel itself, by its rotational behavior, to regulate the time intervals $t_1$, and $t_o$ between brake releasing and brake reapplying inputs. On the basis of the above described gradient value $K$ for the lowest attainable friction, the time $t_1$ for release of braking force is of optimal length for a low friction surface and is not unduly prolonged relative to the best vehicle deceleration attainable under optimum braking conditions.

TIME LIMITING CRITERION

If a wheel comes to a standstill immediately following the issuance of a brake releasing "one" input, the restoration of braking force can not be brought about by acceleration of the wheel, as during the preceding phases of the cyclic braking process. In the absence of the time limiting device 20, and if the vehicle were on a slope, it might start rolling after reaching a full stop, even though its brake pedal was depresed.

To prevent such rolling, the time limiting device 20 issues a brake force reapplying zero input to the hydraulic regulator 7 after a preselected time interval following issuance of a one input. That time interval is so selected as to insure that the time limiting device will not issue its zero input while the wheel is turning. Specifically, that time interval must exceed by a safe margin the time interval occurring between a one and a zero input when the cyclic braking process is taking place with the lowest expectable friction between the wheel and the road. The time interval obviously should not exceed that critical interval by too great an amount, since reasonably prompt restoration of braking force is needed to prevent the stopped vehicle from starting to roll if it is on a substantial slope.

Figure 2:
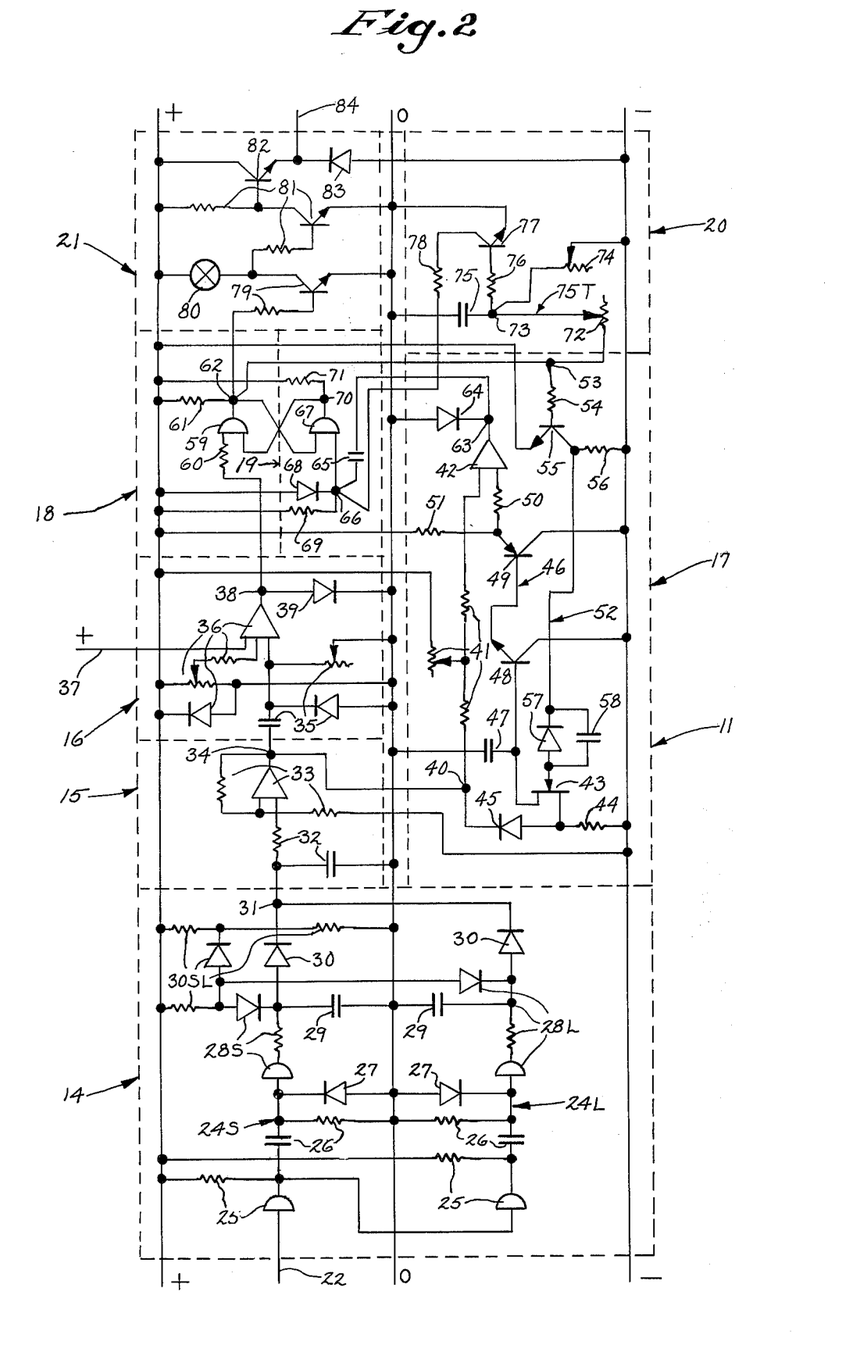
FIG. 2 is a circuit diagram of the electronic control channel for one of the braked wheels, from which brake applying and brake release inputs are issued to a device for regulating the hydraulic pressure at the brakes for that wheel.

With the foregoing explanation of the theoretical basis of the invention, the implementation of its principles by means of the electronic apparatus diagrammed in FIG. 2 can now be considered.

ELECTRONIC CONTROL APPARATUS

Considering the electronic control apparatus in more detail, as it is shown in FIG. 2, the circuit is energized from the vehicle battery (not shown) and has a positive power terminal (+) which is connected with the positive terminal of the battery, a negative power terminal (−) which is connected with the negative terminal of the battery, and a neutral or zero power terminal (O) which is connected with one terminal of a battery cell intermediate those having the positive and negative terminals.

The square wave signal 23 from the signal generator 12 at the wheel is fed, by way of an input line 22, to a pair of identical parallel circuits 24S, 24L, which together comprise the pulse counter 14. The circuit 24S detects the one voltage pulses; the circuit 24L detects the zero no-voltage pulses of the square wave signal. Each of the circuits 24S, 24L comprises a transistorized logic flip-flop 25, a differentiating resistance-capacitance circuit 26, a diode 27 which conducts to the neutral (O) power terminal any negative voltage transients, a detector circuit 28S, 28L, a biased capacitor 29 and a diode 30. A positive stabilizing circuit 30SL is common to both parallel circuits of the pulse counter 14, as is a summation point 31.

Figure 11:
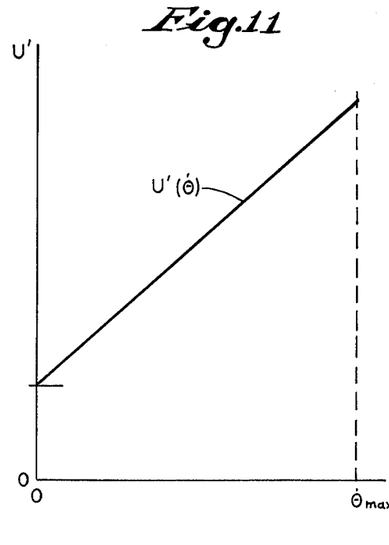
FIG. 11 shows the variation with wheel speed of a voltage obtained from the pulse counter of the electronic control apparatus of this invention.

As pointed out above, and as can be seen from FIG. 11, the speed signal U' that is manifested at the summation point 31, and which constitutes the output of the pulse counter 14, is in the form of a voltage which is proportional to the frequency of the square-wave input signal 23 and which is thus a linear function of rotational speed $\dot{\theta}$ of the wheel. However, since that speed signal voltage is superimposed upon the voltage level of the biased capacitors 29, the voltage level that corresponds to zero rotational speed has an arbitrary positive value.

Figure 12:
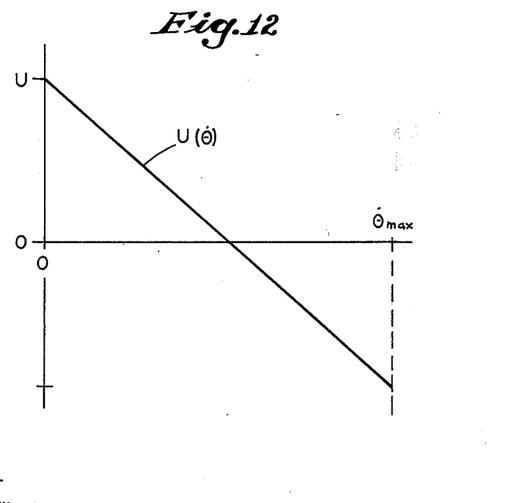
FIG. 12 illustrates the voltage shown in FIG. 11 as converted in a converter that comprises another part of the control apparatus.

The converter 15 converts the U' signal to a converted, reinforced wheel speed signal U which — as may be seen from FIG. 12 — is in effect an inverted and downwardly translated analogue of the U' signal that crosses the zero voltage level at a point about midway between maximum wheel rotational speed and zero rotational speed.

The converter 15 (referring again to FIG. 2) comprises a speed signal stabilizing circuit 32 to which is fed the U' speed signal from the summation point 31 of pulse counter 14. The stabilized signal thence passes to a sign changing and level modifying circuit 33 having an output terminal 34 at which the converted speed signal U is manifested.

The first comparison unit 16 serves to detect whether or not wheel deceleration has satisfied the condition for issuance of a brake releasing one input to the hydraulic regulator 7. That comparison unit has a differentiating circuit 35 that comprises a capacitor, a variable resistor by means of which the time constant of the differentiating circuit can be adjusted, and a diode that passes negative voltage to the neutral (O) power terminal. The differentiating circuit 35 differentiates the converted wheel speed signal U with respect to time, so that its output corresponds to $$\frac{dU}{dt}.$$

The comparison unit 16 also has a comparison circuit 36 that comprises a diode for conducting positive transient voltages to the positive (+) power terminal and a variable resistor that can be adjusted to produce a voltage level corresponding to the deceleration threshold value $$\frac{d\dot{\theta}}{dt}.$$

The comparison circuit 36 of the comparison unit 16 further comprises an amplifier in which the $$\frac{dU}{dt}$$

signal is compared with the locally generated $$\frac{d\dot{\theta}}{dt}$$

signal, and which also has an input lead 37 from which it receives a fixed positive voltage whenever the signal device 13 at the master cylinder 5 is in its braking condition. With such a signal present on the conductor 37, the amplifier of the comparison circuit 36 issues an output to its output terminal 38 whenever the $$\frac{dU}{dt}$$

voltage is equal to, or tends to exceed, the $$\frac{d\dot{\theta}}{dt}$$

reference voltage that corresponds to the brake releasing threshold value. The output thus issued is a negative voltage pulse which is fed to the logic units 18 and 19 to effect issuance of a one input to the hydraulic regulator solenoid 8. When no such output is being issued, the output terminal 38 is at a low positive voltage level, maintained by a diode 39 connected between it and the neutral (O) power terminal.

The second comparison unit 17 serves to calculate a changing wheel speed that is the criterion for brake force reapplication, and compares that changing calculated wheel speed with the actual speed of the accelerating wheel, issuing an output when they are equal. A speed signal U that corresponds to the existing speed of the wheel is available at the output terminal 34 of the first comparison unit 16, and therefore that terminal 34 is connected with an input terminal 40 of the second comparison unit 17. The second comparison unit comprises a wheel speed signal circuit 41 which is connected between the input terminal 40 and a comparison circuit 42 and which includes a variable resistor. One terminal of a current regulating rectifier 43 is connected with the input terminal 40, by way of a current regulating diode 45, and also with the negative power terminal, by way of a resistor 44. Another terminal of the regulating rectifier 43 is connected with a signal generating circuit 46, which is also connected with the comparison circuit 42. The signal generating circuit comprises a capacitor 47, two transistors 48 and 49, and two resistors 50 and 51. There is a starting circuit 52 between the third terminal of the regulating rectifier and a second input terminal 53 for the second comparison unit 17. Tracing the starting circuit from the input terminal 53, it comprises a resistor 54 which is connected to the base terminal of a transistor 55. One of the other terminals of that transistor is connected with the positive power terminal, and its third terminal is connected, via a resistor 56, with the negative power terminal. The starting circuit 52 also comprises a diode 57 that has a capacitor 58 shunted across it.

As will be explained hereinafter, a negative pulse output appearing at the output terminal 38 of the first comparison unit 16 is, in effect, inverted in the logic device 18, so that a one signal appears at the output terminal 62 thereof. That one signal, which issues when the brake release threshold value has been attained by the decelerating wheel, is also fed to the input terminal 53 of the second comparison unit 17 by way of a conductor connecting the terminals 62 and 53, and initiates operation of the starting circuit 52. In turn, operation of the starting circuit 52 causes the signal generating circuit 46 to start generating signal Q that corresponds to calculated wheel speed under the linear preselected vehicle deceleration at worst expectable surface conditions. In comparison circuit 42 the calculated speed signal Q is compared with the wheel speed signal U produced by the wheel speed signal circuit 41. When there is a correspondence between those two wheel speed signals, the comparison circuit emits a positive output voltage to its output terminal 63. A diode 64 conducts negative voltages from the terminal 63 to the neutral (O) power terminal.

The first logic device 18 comprises a bistable flip-flop 59 that has one of its input terminals connected, through a resistor 60, with the output terminal 38 of the first comparison unit 16. The output terminal 62 of the flip-flop 59 is connected, through a resistor 61, with the positive power terminal. When a negative pulse appears at the output terminal 38 of the first comparison unit 16, a one signal is produced at the output terminal 62 of the logic device 18.

The other logic device 19 comprises a capacitor 65 connected between the output terminal 63 of the second comparison unit 17 and a junction point 66. Also connected with the junction point 66 are one input terminal of another bistable flip-flop 67, a diode 67 and a resistor 68, the last mentioned diode and resistor being connected, in parallel with one another, between the junction point 66 and the positive power terminal.

The flip-flop 59, 67 of each logic device 18, 19 has its output terminal 62, 70 connected with the other input terminal of the other flip-flop. Hence the outputs of those two flip-flops are always opposites, and when the output of either flip-flop switches from zero to one, the output of the other switches from one to zero.

Note that the output terminal 70 of flip-flop 67 is connected with the positive power terminal through a resistor 71, similarly to the connection of output terminal 62 to that power terminal through the resistor 61. When a negative pulse appears at the output terminal 38 of the first comparison circuit, causing a one signal to appear at the output terminal 62 of logic device 18, the flip-flop 67 of logic device 19 is switched so that a zero voltage appears at its output terminal 70. In like manner, when a positive voltage pulse appears at the output terminal 63 of the second comparison unit 17, signifying correspondence of the two compared wheel speeds, the bistable flip-flop 67 of logic device 19 is switched, via capacitor 65, so that a positive voltage appears at its output terminal 70, and the flip-flop 59 of the first logic device 18 is switched to produce a zero voltage at its output terminal 62.

The time limiting device 20 comprises a variable resistor 72 that is connected between the output terminal 62 of the first logic device and a junction point 73. Another variable resistor 74 is connected between the junction point 73 and the negative power terminal. A capacitor 75, connected between the junction point 73 and the neutral power terminal, cooperates with the variable resistors 72 and 74 to provide a time circuit 75T. Also connected to the junction point 73, through a resistor 76, is the base terminal of a transistor 77 that has its collector-emitter circuit connected between the neutral power terminal and the junction point 66 that constitutes an input terminal for the flip-flop 67 of logic device 19. A resistor 78 is connected in series with the collector-emitter circuit of transistor 77.

It will be apparent that when a one (brake releasing) signal appears at the output terminal 62 of logic device 18, that signal is impressed upon the time circuit 75T of the time limiting device 20; and, after a time interval determined by the adjustment of variable resistors 72 and 74, the input terminal of flip-flop 67 that is connected with junction point 66 is connected with the neutral power terminal through transistor 77. This switches the flip-flop 67 of logic device 19 to its condition at which a positive voltage (one signal) appears at its output terminal 70, and consequently also switches the flip-flop 59 of logic device 18 so that a zero signal appears at its output terminal 62. A zero voltage at output terminal 62 zeroes the time circuit 75T irrespective of whether that zero voltage originates in the logic device 19 or in the time limiting device 20.

The power generating device comprises an indicating circuit 79 which is connected with the output terminal 62 of the logic device 18 and which energizes a lamp 80, and a driving circuit 81 which controls a field effect transistor 82. The transistor 82 is protected by a diode 83 connected in series between it and the negative power terminal.

It will be apparent that when a one voltage signal appears at the output terminal 62, the transistor 82 is rendered conductive, and an output conductor 84, connected with the solenoid valve 8 of the hydraulic regulator, delivers a current to that solenoid valve which effects release of braking force.

From the foregoing description taken with the accompanying drawings it will be apparent that this invention provides control apparatus for an anti-skid hydraulic braking system that assures the cyclical application of braking force to a wheel in such a manner as to provide optimum deceleration of the braked vehicle under all conditions of road surface.

Those skilled in the art will appreciate that the invention can be embodied in forms other than as herein disclosed for purposes of illustration.

The invention is defined by the following claims:
We claim:

1. In a vehicle having a wheel which engages a surface that the vehicle traverses, a brake through which braking force can be applied to the wheel to effect frictional retardation of the rotational speed of the wheel, a brake control element manually movable to and from a position in which braking force is produced, and regulator means for relieving braking force from the wheel in response to a brake releasing control input and for reapplying braking force to the wheel in response to a brake reapplying control input, so that the wheel can be alternately braked and released to prevent its locking, control means for said regulator means by which said control inputs are produced at such times as to assure deceleration of the vehicle substantially as quickly as conditions of said surface permit, said control means comprising:

A. speed signal means for generating a speed signal which corresponds to the rotational speed of the wheel;

B. differentiating means connected with the speed signal means to be responsive to the speed signal therefrom, for generating a deceleration output that corresponds to the rate of rotational deceleration of the wheel in response to applied braking force;

C. deceleration reference signal generating means for generating a signal corresponding to a predetermined rate of rotational deceleration of the wheel, substantially equal to the maximum deceleration that the wheel could attain in sliding on a surface with which it had a substantially optimum coefficient of friction;

D. deceleration comparison means for the wheel, connected with said differentiating means and with said deceleration reference signal generating means and which issues a brake releasing control input to said regulator means when the deceleration output of the differentiating means corresponds to a deceleration rate at least equal to that signified by the signal from the deceleration reference signal generating means;

E. gradient signal generating means for the wheel for producing, beginning at each instant when a brake releasing control input is produced, a gradient signal which initially corresponds to the actual rotational speed of the wheel at said instant and including means for thereafter causing the gradient signal to correspond at each instant to the instantaneous rotational speed that the wheel would have if it had decelerated from said actual rotational speed at the maximum rate of deceleration that the vehicle could attain on a surface providing the lowest expectable friction with the wheel; and F. wheel speed comparison means connected with said speed signal means and said gradient signal means, for issuing a brake reapplying control input to said regulator means at that time after issuance of each brake releasing control input when rotational speed of the wheel becomes equal to the wheel speed then signified by the gradient signal.

2. The method by which a brake for a wheel of a vehicle can be temporarily released to prevent wheel locking and reapplied to obtain the optimum deceleration of the vehicle that is available on a surface traversed by the wheel, each release of the brake being effected in response to a release input to regulator means for the brake and each reapplication of the brake being effected in response to a restoration input to the regulator means, said method being characterized by:

A. producing a wheel speed signal which at all times during braking corresponds to the prevailing rotational speed of the wheel;
B. at times when the wheel is decelerating, differentiating said wheel speed signal to produce a wheel deceleration signal corresponding to the rate of deceleration of the wheel;
C. producing a deceleration criterion signal which is comparable with said wheel deceleration signal and which corresponds to substantially the maximum rate of deceleration that the wheel could attain in sliding on a surface with which it had substantially the maximum attainable coefficient of friction;
D. issuing a brake releasing input to the regulator means at each instant when the wheel deceleration signal becomes at least equal to the deceleration criterion signal;
E. at each said instant beginning the generation of a speed criterion signal
   1. which is comparable with the wheel speed signal,
   2. which has an initial magnitude corresponding to the actual speed of the wheel at said instant, and
F. so effecting the speed criterion signal as to produce thereafter an instantaneous magnitude corresponding to the rotational speed that the wheel would have had if it had decelerated from said actual speed at a rate corresponding to the maximum deceleration that the vehicle could attain on a surface providing the lowest expectable friction with the wheel; and
G. issuing a restoration input to the regulator means when the magnitude of the wheel speed signal becomes equal to that of the speed criterion signal.

* * * * *

UNITED STATES PATENT OFFICE
CERTIFICATE OF CORRECTION

PATENT NO. : 3,917,353
DATED : November 4, 1975
INVENTOR(S) : LENNART BROR ANDERS SWIDEN and WALDEMAR LESTER It is certified that error appears in the above-identified patent and that said Letters Patent are hereby corrected as shown below:

Col. 8, Line 13: "or" should read --to--

Col. 18, Lines 7 and 8: "so effecting the speed criterion signal as to produce thereafter"

should read

--thereafter so effecting the speed criterion signal as to produce--

Signed and Sealed this twenty-seventh Day of April 1976

[SEAL]

Attest:

RUTH C. MASON
*Attesting Officer*

C. MARSHALL DANN
*Commissioner of Patents and Trademarks*